United States Patent [19]
Palkovics

[11] 4,453,562
[45] Jun. 12, 1984

[54] RAIN SHIELD FOR INSULATED PIPE INSTALLATIONS

[75] Inventor: William J. Palkovics, Richmond, Va.

[73] Assignee: Topline Products, Inc., Richmond, Va.

[21] Appl. No.: 418,912

[22] Filed: Sep. 16, 1982

[51] Int. Cl.³ .............................................. E03B 1/00
[52] U.S. Cl. .................................... 137/382; 52/58; 52/101; 52/199; 248/62
[58] Field of Search ............................ 52/58, 101, 199; 248/62, 58, 345; 137/382; 428/36

[56] References Cited
U.S. PATENT DOCUMENTS

| | | | |
|---|---|---|---|
| 1,883,508 | 10/1932 | Benday | 52/58 |
| 4,010,578 | 3/1977 | Logsdon | 52/58 |
| 4,160,347 | 7/1979 | Logsdon | 52/199 |

FOREIGN PATENT DOCUMENTS

| | | | |
|---|---|---|---|
| 765148 | 8/1967 | Canada | 52/58 |
| 881964 | 7/1953 | Fed. Rep. of Germany | 52/58 |
| 1475122 | 2/1967 | France | 52/58 |

Primary Examiner—William R. Dixon, Jr.
Attorney, Agent, or Firm—Ziems, Walter & Shannon

[57] ABSTRACT

A rain shield accessory for jacketed insulated pipe installations having vertically projecting rod-like appendages such as hanger rods, valve stems, and the like. The rain shield is an inverted funnel-shaped member of resilient sheet material so as to define a frustoconical body portion joined at its upper or small diameter end with a coaxial cylindrical neck portion. The sheet material from which the member is formed is precurled about the axis of the body to provide a voluted overlap particularly in the region of the cylindrical neck portion so that the member can be opened and placed about rod-like appendages of widely varying diameters.

5 Claims, 5 Drawing Figures

RAIN SHIELD FOR INSULATED PIPE INSTALLATIONS

BACKGROUND OF THE INVENTION

This invention relates to insulated pipe jacketing accessories and, more particularly, to a rain shielding accessory for preventing deterioration of jacketed pipes and/or pipe insulation as a result of water concentration and collection at the base of vertically-projecting pipe appendages such as hanger rods, valve stems, and the like.

Many industrial installations require extensive use of above-ground, outdoor pipe systems for handling a wide variety of fluids which are temperature sensitive in the sense that thermal insulation is required or desirable in the attainment of overall fluid handling efficiency. Insulation of such pipe systems, in turn, is most effectively accomplished by suspending each pipe in space from appropriate supports by depending rods connected to the pipe at spaced intervals along the length thereof, placing any of several acceptable insulating materials about the periphery of the pipe and covering the insulation with an impermeable jacketing material such as sheet plastic, stainless steel, fiber reinforced resin, or the like. The jacketing functions primarily to protect the insulation from deterioration from impregnation of dust and/or water as well as from physical damage.

Jacketing systems are available which are highly effective for encapsulation of pipe insulation and which are capable of application with relative ease to cylindrical lengths of pipe as well as to the various fittings conventionally used in pipe systems such as L's, T's, valve bodies, and the like. Various types of sheet plastic jacketing systems are particularly suited to this application because of the facility offered by such material for an hermetic seal by solvent welding and the general capability of the material to provide weather-proof encapsulation of insulated pipes and fittings.

With all such available insulation jacketing, particularly in outdoor pipe installations, a serious problem is presented by the presence of vertically-projecting pipe appendages such as hanger rods, valve stems, and the like. Such pipe appendages must project through the insulation and jacketing in a way so as to require a caulking-like sealant between the stem or rod and the pipe jacketing in order to effect a complete hermetic seal. Such sealants, however, even with regular maintenance, deteriorate with age and exposure to result in a leakage point in the context of the overall hermetic seal provided by the jacketing. Moreover, because of the location of the caulking-type seal at the base of the vertically-extending rod or valve stem, the point of leakage is most vulnerable to water running down the surface of the rod or valve stem. As a result of this problem, serious damage is caused both to the insulation underlying the jacketing, components entrained in the insulation, and often to the pipe itself. The wetting of insulation in the base of hanger rods, valve stems, and the like, can require replacement of insulation as often as once a year in many industrial installations. Also, because of the toxic nature of the atmosphere in which industrial pipe systems are used, rain water can become sufficiently corrosive to damage the pipe itself, particularly in the concentrated area underlying a suspension rod, for example. In other types of installations where electrical tracers are embedded in the insulation, the tracers are severely damaged so as to require replacement on a regular basis.

In light of the foregoing, it will be appreciated that there is need for an acceptable solution to the problems associated with leakage of pipe insulation jacketing in the region of hanger rods, valve stems, and the like.

SUMMARY OF THE INVENTION

In accordance with the present invention, the problems associated with seal deterioration in pipe insulation jacketing at the base of such vertical appendages as hanger rods, valve stems, and the like, are substantially alleviated by the provision of a rain shield which is inexpensive, which is easily applied to existing pipe systems and which is highly effective to prevent water from penetrating insulation jacketing at the base of such vertical appendages. Structurally, the rain shield of the present invention is in the nature of an inverted funnel-shaped member formed of resilient sheet material such as plastic which is precurled to provide a substantial volute overlap extending throughout the length of the member with the sheet material in a relaxed condition. The cylindrical upper portion of the inverted funnel-shaped member as well as the remainder of the member is opened and placed transversely about a rod or stem and then allowed to spring back to its original or normal condition. An effective seal of the upper neck portion of the member is achieved by an appropriate mastic and a conventional stainless steel pipe clamp, for example. The lower, downwardly diverging portion of the member may be shaped to conform with the pipe insulation jacketing or merely spaced therefrom in the nature of a protective roof preventing water from access to the juncture of the appendage with the major portion of the pipe insulation jacketing.

A principal object of the present invention is, therefore, to provide a rain shield for insulated and jacketed outdoor pipe installations which is particularly effective in avoiding the problems associated with water leakage at the base of hanger rods and valve stems. Other objects and further scope of applicability of the present invention will become apparent from the detailed description to follow taken on conjunction with the accompanying drawings.

DETAILED DESCRIPTION OF THE PREFERRED EMBODIMENT

Figure 1:
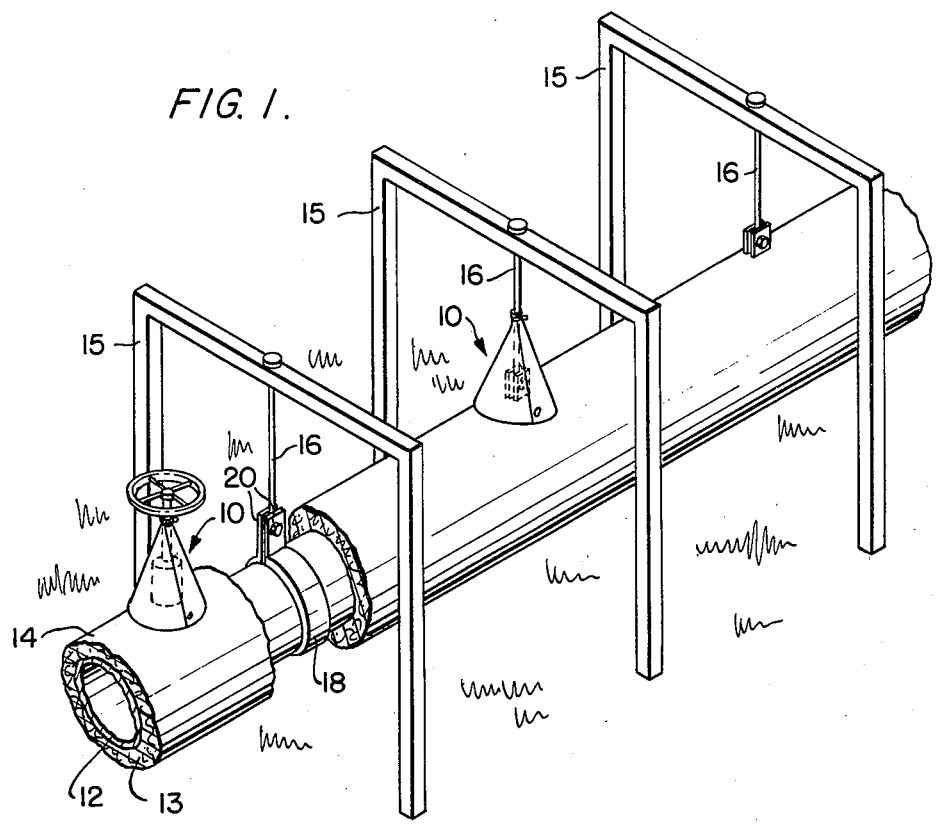
FIG. 1 is a perspective view illustrating a conventional outdoor pipe installation incorporating an exemplary embodiment of the present invention.
Figure 2:
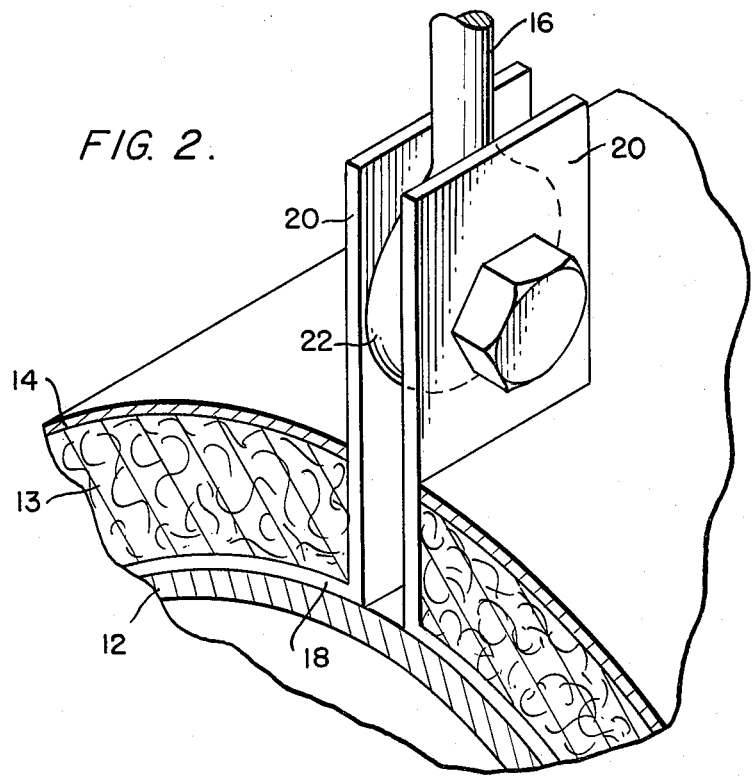
FIG. 2 is an enlarged fragmentary perspective view in partial cross section illustrating the organization of a conventional outdoor pipe hanger.

In FIGS. 1 and 2 of the drawings, the rain shield of the present invention is designated by the reference numeral 10 and shown with a section of pipe representing a typical insulated outdoor pipe installation. Thus, a cylindrical pipe 12, circumscribed by a layer of insulation 13 and an exterior jacket 14, is suspended above the ground from a plurality of inverted U-shaped standards 15 by hanger rods 16 depending from the standards to a pipe carrier affixed to the pipe 12. In the drawings, the pipe carrier is represented by a band 18 having upturned end flanges 20 bolted or otherwise secured to an eye 22 at the base of each of the hanger rods 16. While the illustrated connection of the rod 16 to the pipe 12 is typical, it is merely representative of a wide variety of such connections and may range from a simple direct welded connection of the rod 16 to the pipe 12 to an assortment of pipe saddles differing substantially from the organization of the band 18. It is to be noted, however, that the physical connection of the rod 16 is internal or directly to the pipe 12 as distinguished from exterior to or about the jacketing 14 in order to facilitate placement and maintenance of the insulation and jacketing as well as to avoid the deleterious effects of compacting the insulation 13 under the weight of the pipe 12 and its contents.

The result of the internal connection of the hanger rod 16 to the pipe 12 is, as depicted in FIG. 2 of the drawings, a break in the continuity of the external jacketing 14 due to the need for the pipe supporting structure to extend through the jacketing 14 and the insulation 13. In the illustrated example, the flanges 20 of the band 18 project through the insulation 13 and jacketing 14. Heretofore, continuity of the jacketing seal at the base of the rod 16 has been effected by caulking or placement of a mastic-type sealing compound throughout the region at the juncture of the jacketing 14 and the flanges 20 (in the illustrated arrangement) in order to prevent water from passing through the jacketing to the insulation 13 and pipe 12. Although available caulking materials are admirably suited to effect such a seal, they are vulnerable to deterioration in time by exposure to elements and constitute a weakness in the jacketing seal at a most vulnerable point due to the potential for rain water and the like to collect on and run down the length of any one of the rods 16. A similar condition is presented by other vertical pipe appendages such as the stem of a valve actuator 24 (FIG. 1). Effective sealing at the stem of a valve is even more aggravated as a result of the need for the valve stem to rotate relative to the jacketing 14 and the pipe 12.

Figure 3:
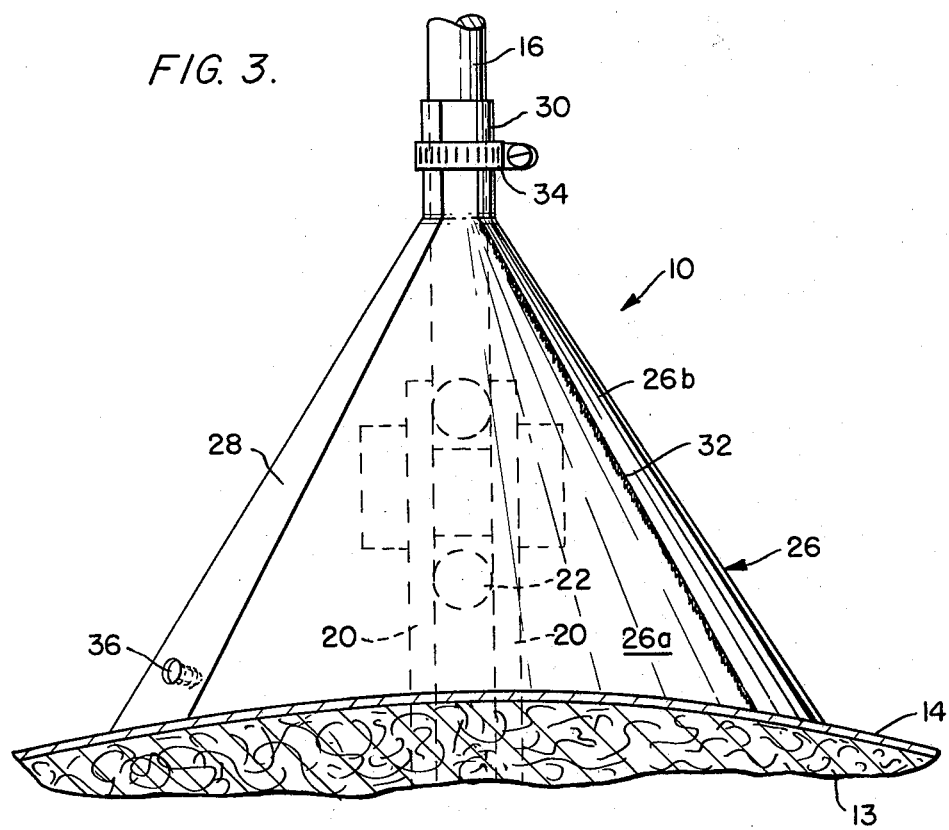
FIG. 3 is an enlarged side elevation illustrating the rain shield of the present invention after installation.
Figure 4:
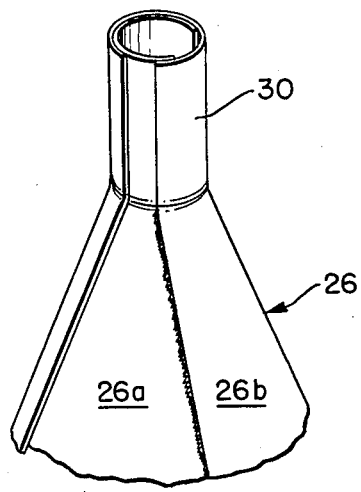
FIG. 4 is a fragmentary perspective view illustrating the upper portion of the rain shield of the present invention in a normal unstressed condition.
Figure 5:
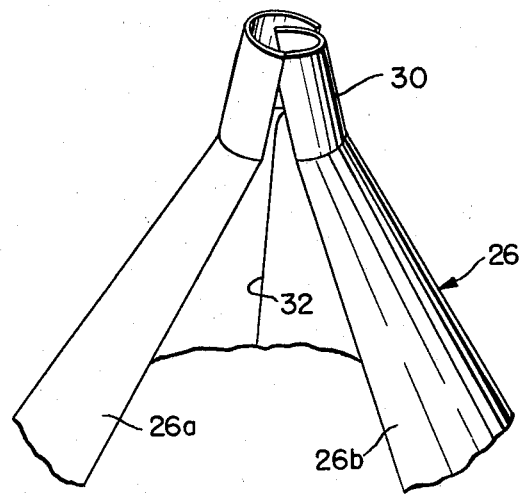
FIG. 5 is a fragmentary perspective view showing the portion illustrated in FIG. 5 in an open condition for application to a pipe hanger rod or valve stem.

A more complete understanding of the rain shield 10 may be had by reference to FIGS. 3-5 of the drawings. In particular, the rain shield is constituted by an inverted funnel-shaped member 26 formed of resilient sheet plastic material such as polyvinyl chloride, polystyrene, ABS, and the like. The configuration of the member 26 thus defines an upwardly converging frustoconical body portion 28 joined at its upper or small end with a coaxial cylindrical neck portion 30. The member 26 preferably includes two longitudinal half sections 26a and 26b secured along the complete length of the member throughout the frustoconical body 28 and the neck portion 30 by solvent welding along a seam 32. As a result of this construction, the two longitudinal half sections of the member 26 may be preformed by vacuum-forming techniques so that in a relaxed state of the sheet material from which the member is formed, the sheet material will overlap on the side opposite from the seam 32 to provide a substantial voluted overlap particularly in the region of the neck portion 30. As may be observed in FIG. 4, for example, the voluted overlap in the cylindrical neck portion 30 extends through approximately 180 degrees principally to accommodate a wide range of rod diameters about which the neck portion will be fixed in the manner to be described in more detail below. The overlap along the body 28 of the member 26 may be diminished in the interest primarily of conserving material.

The thickness of the plastic material from which the member 26 is formed may vary depending on the size of the member 26 principally to insure adequate strength so that it will retain its normal configuration under an essentially relaxed state of the sheet material from which it is formed. It is important, however, that the sheet material be sufficiently resilient so that it may be spread to an open condition as represented in FIG. 5 of the drawings to be laterally placed about a rod or valve stem and returned to its original or normal closed configuration under the elasticity of the sheet material. Using any of the plastic materials indicated above, it is contemplated that the sheet material from which the member 26 is formed may vary in thickness from 0.010 to 0.060 inches.

Placement of the rain shield 10 on either the stem of the valve actuator 20 or the rod 16 to the position illustrated in FIGS. 1 and 3 is achieved very simply by first placing a mastic-like flashing compound either on the interior of the neck portion 30 of the member 26 or about the exterior of the rod or valve stem, opening the member 26 to the approximate configuration illustrated in FIG. 5 and applying the same laterally against and about the hanger rod 16 or valve stem. By relieving the stress holding the member 26 in such an open condition, the inherent resiliency of the sheet material will cause it to resume its normal closed condition about the rod or valve stem. Thereafter, it is secured in place by application of a stainless steel hose clamp 34 (FIG. 3) applied about the cylindrical neck portion 30. The frustoconical body portion 28 is secured in the closed condition by inserting one or more self-tapping screws 36 in the region of the body overlap. The screws 36 are preferably nylon screws which are adequate for the needed retention of the overlapped portions of sheet material and which are highly resistant to corrosion.

The bottom of the frustoconical portion may be first cut to shape in the field to conform with the configuration of the jacketing 14 and either solvent welded or otherwise secured in place using an appropriate adhesive. Such securement, however, is not needed for effective functioning of the rain shield. In its application to the stem of the valve actuator 24, for example, the bottom lip or edge of the member 26 might be spaced slightly from the jacketing 14 to allow rotation of the valve actuator and the rain shield as a unit relative to the outer jacketing.

Thus, it will be appreciated that as a result of the present invention a highly effective rain shielding accessory for jacketing pipe installations is provided by which the stated objective among others are completely fulfilled. Also, it will be apparent to those skilled in the art and it is in fact contemplated that modifications of the embodiment illustrated and described herein may be made without departure from the present invention. Accordingly, it is expressly intended that the foregoing description and accompanying drawings are illustrative only, not limiting, and that the true spirit and scope of the present invention will be determined by reference to the appended claims.

I claim:

1. A rain shield for jacketed insulated pipe systems having vertically projecting rod-like appendages, such as hanger rods, valve stems, and the like, said rain shield comprising:

an inverted funnel-shaped member of resilient sheet material defining a frustoconical body portion joined at its upper end with a coaxial cylindrical neck portion, said sheet material being precurled about the axis of said body and neck portions to establish the normal configuration of said member and to provide a substantial voluted overlap at least in the region including said neck portion when said sheet material is in a relaxed state, said overlap providing a reclosable opening throughout the length of said body and neck portions by unwrapping said sheet material sufficiently so that said member may be placed transversely about a rod or equivalent to spring back into its normal configuration; and means for securing said neck portion in sealed relationship about the exterior of a rod about which said member is placed.

2. The apparatus recited in claim 1, wherein said member comprises a pair of preformed half-sections connected by solvent welding.

3. The apparatus recited in either of claims 1 or 2, wherein said voluted overlap in the region including said neck portion extends through approximately 180 degrees.

4. The apparatus recited in claim 3, wherein said means for securing said neck portion comprises an external clamping band.

5. The apparatus recited in claim 1, including means to connect overlapped layers of said body portion after installation of said member about a rod or equivalent.

* * * * *